United States Patent [19]

Burkwall, Jr. et al.

[11] 3,962,462
[45] June 8, 1976

[54] STABILIZATION OF DRY PET FOOD

[75] Inventors: Morris P. Burkwall, Jr.; Joseph C. Leyh, both of Barrington, Ill.

[73] Assignee: The Quaker Oats Company, Chicago, Ill.

[22] Filed: May 31, 1974

[21] Appl. No.: 475,283

[52] U.S. Cl............................ 426/1; 426/512; 426/516; 426/805
[51] Int. Cl.² ........................................ A23K 1/18
[58] Field of Search ............... 426/1, 151, 210, 72, 426/805, 104, 147, 146, 346, 512, 516, 517

[56] References Cited
UNITED STATES PATENTS

| | | | |
|---|---|---|---|
| 3,202,514 | 8/1965 | Burgess et al. | 426/72 |
| 3,467,525 | 9/1969 | Hale | 426/805 |
| 3,862,336 | 1/1975 | Kofsky | 426/168 |

Primary Examiner—Jeanette M. Hunter
Attorney, Agent, or Firm—Charles J. Hunter

[57] ABSTRACT

Dry pet food may be stored along with semi-moist pet food without loss of integrity by producing a dry pet food utilizing specific ingredients to impart stability. Thus, the dry pet food is produced from proteinaceous ingredients, amylaceous ingredients, as well as a stabilization system consisting of a sugar, an edible acid, and an antimycotic.

10 Claims, 3 Drawing Figures

U.S. Patent   June 8, 1976   3,962,462
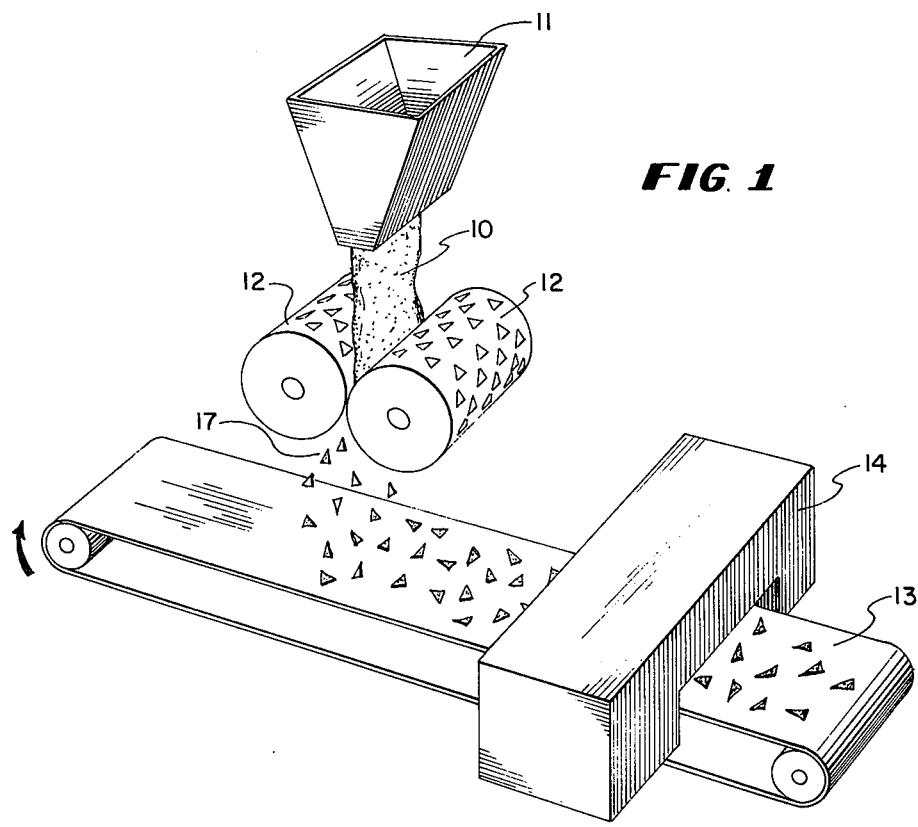
FIG. 1
FIG. 2
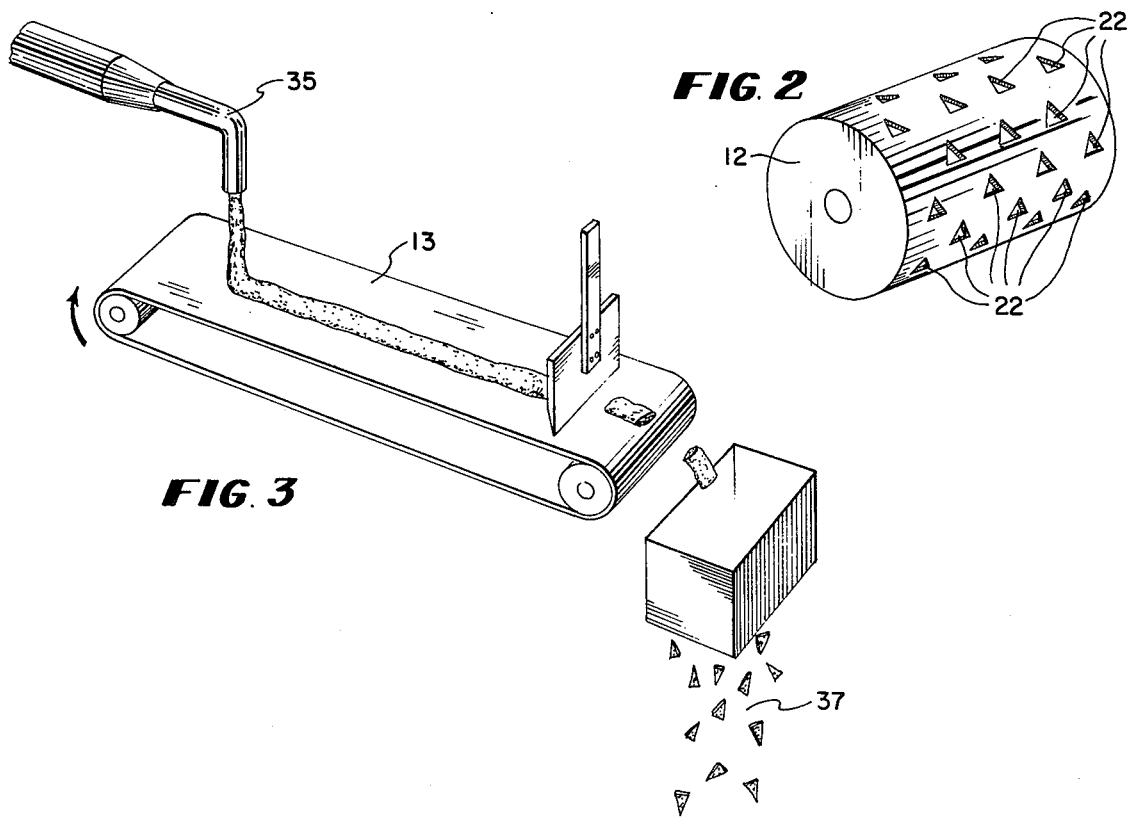
FIG. 3

STABILIZATION OF DRY PET FOOD

BACKGROUND OF THE INVENTION

The invention relates to a method for the stabilization of dry pet foods when such foods are subjected to semimoist conditions. More specifically, the invention relates to a wafer-like supplement that is produced as a dry pet food yet stored and packaged along with a semi-moist pet food. As an art recognized term "dry pet food" means one having a moisture content less than 15 percent by weight of the final product. By "semi-moist pet food" is meant one having a moisture content between 15 and 50 percent by weight of the final product.

Pet foods having a moisture content below 15 percent normally do not require protection against microbiological decomposition. When packaged with a product having a higher moisture content, the moisture content of the pet foods tend to equalize leading to decomposition of the dry pet food.

Thus, dry pet foods heretofore could not be produced, and stored with semi-moist for fear that the dry pet food would lose its integrity and become moldy and often soggy. The production of these two types of pet foods had to be separated to prevent any accidental intermingling.

It has similarly felt to be impossible to package a semi-moist pet food along with a dry pet food because it was felt that the moisture content of the two types of pet foods would equalize causing a loss of integrity to the dry pet food. It was further felt that the dry pet food would require great amounts of sugar to prevent microbiological deterioration. Thus, propositions for the production of nutritional supplements to pet foods required that the supplements be of the same type as the pet food itself. For example, it was felt that a semi-moist pet food required the use of a semi-moist supplement high in sugar content. The present invention, however, relates to a method for stabilizing dry pet foods so that they can be used as supplements with semi-moist pet foods without requiring the use of great amounts of sugar, i.e., 25 percent, required by semi-moist pet foods for stability.

SUMMARY OF THE INVENTION

It is, therefore, an object of the present invention to provide a method for the stabilization of dry pet food subjected to semi-moist conditions without the use of large amounts of sugar.

It is yet another object of this invention to provide a method for the production of a wafer-like supplement which can be utilized as a nutritional supplement to semi-moist pet foods.

Still another object of this invention is to provide a method for the production of a dry, wafer-like supplement for use with semi-moist pet foods.

These and other objects of the invention which will become apparent are accomplished by producing a dry pet food utilizing proteinaceous ingredients along with amylaceous ingredients, a sugar, an edible acid, and an antimycotic, and processing in a manner to yield a wafer-like supplement having a moisture content below 15 percent, and preferably below 10 percent.

BRIEF DESCRIPTION OF THE DRAWINGS

The invention may be further described but is not limited by the enclosed drawings wherein:

FIG. 1 is a perspective view of a system utilized in the process of the invention;

FIG. 2 is a perspective view of a rotary mold that may be used to shape the product; and FIG. 3 is a perspective view of another system that may be utilized in the process of the invention.

DETAILED DESCRIPTION

In accordance with the novel aspects of the present invention, a pet food having a moisture content below 15 percent by weight is produced utilizing a small amount of sugar along with an edible acid and an antimycotic. This dry pet food is capable of being packaged with pet foods having a moisture content above 15 percent and as high as 50 percent. As used herein percentages are understood to be by weight of the final product unless specified otherwise.

The novel pet food is produced from proteinaceous material, amylaceous ingredients, and a stability system comprising a sugar, an edible acid, and an antimycotic. Vitamins and supplements may be utilized as well.

A nutritious pet food produced in accordance with the present invention will generally include up to 75 percent proteinaceous material having a total protein content of up to 50 percent of the final product.

The first source of proteinaceous material is obtained from animal protein. By the term animal protein is meant meat and meat by-products. Meat is defined as the flesh of cattle, swine, sheep, goats, horses, whale and other mammals, poultry and fish. Meat by-products are those things accepted by Title 9, Chapter 1, Subchapter H, Code of Federal Regulations, 1971 Edition, and also includes meat and bone meal, fish meal, fish protein concentrate, poultry by-products and blood meal.

Another source of proteinaceous material utilized to form the dry pet food of the invention, herein referred to as nutritious protein, is derived from non-animal sources. Examples of such sources are those proteins derived from cheese, egg, egg yolk, egg white, and yeast. Alto useful are the proteins derived from vegetable sources, i.e., those proteins obtained from oil seeds and legumes, as well as the oil-expressed or extracted meals and cakes and protein isolates thereof recovered by acid or alkali digestion and precipitation; typical of such vegetable protein sources are soybean, soybean meal, cottonseed meal, peanuts, peanut meal, etc.

Amylaceous ingredients can be added to the proteinaceous material discussed above. By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, mylo, barley, rye, and the various milling by-products of these cereal grains such as wheat feed flour, wheat middlings, wheat mixed feed, wheat shorts, wheat red dog, oat groats, hominy feed and other such material. Also included as sources of amylaceous ingredients are the tuberous foodstuffs such as potatoes, tapioca, and the like. Still other examples of amylaceous ingredients are the grain or tuberous starches and modified starches. By the term "modified starch" we mean the use of thin boiling (acid or oxidized treatment) or thick boiling regular grain or tuberous starch, high amylose corn starch, or other waxy starch or combinations thereof either pregelatinized before or after or distinct from the treatment with crosslinking agents such as sodium trimetaphosphate or phosphorous oxichloride, and known equivalents along or in conjunction with alkylating agents such as propylene oxides or acetyllating agents such as acetic anhydride.

To produce a supplement having a high vitamin content, vitamins such as choline chloride, vitamin E, riboflavin, inositol, niacin, vitamin A palmitate, calcium pathenate, thiamin mononitrate, vitamin A, vitamin $D_3$, pyridoxine hydrochloride, may be added as well. Flavor, color, and other supplements may be added where necessary to improve the appearance and palatability of the dry pet food. Mineral supplements such as dicalcium phosphate, iron oxide, cobalt carbonate, potassium iodide, ferrous fumarate, etc., may be added also.

In order to provide stability within the pet food produced from the above ingredients when that pet food is subjected to semi-moist conditions, a stabilizing system comprising a sugar, an edible acid, and an antimycotic are added to those ingredients.

By use herein of the term sugar we intend to mean any saccharide which is soluble in water to an extent that the osmotic pressure of a water solution of such a saccharide will provide the requisite bacteriostatic effect. In addition, the saccharide is required to be nontoxic. The saccharide must not provide any undesirable taste effects when used in the required concentration. It is preferred that the sugar be a low molecular weight sugar since sugars of a lower molecular weight have a more pronounced effect in increasing the osmotic pressure of a sugar solution than do sugars of a higher molecular weight. Among the sugars that may be used for this invention are the reducing and nonreducing water soluble monosaccharides; the reducing and nonreducing polysaccharides and their degradation products such as pentoses, aldopentoses, methylpentoses, ketopentoses, e.g., xylose and arabinose; rhamnose; hexoses and reducing polysaccharides; aldo hexoses like glucose, galactose and mannose; the ketohexoses including fructose and sorbose; the disaccharides including maltose and lactose; the nonreducing disaccharides such as sucrose; and other polysaccharides such as dextrin and raffinose and hydrolyzed starches which contain as their constituents oligosaccharides.

By use of the term sugar equivalents we intend to mean a compound which can be added to the mixture to produce the same effect on osmotic pressure as would sugar. Generally the sugar equivalents include the polyhydric alcohols which are nontoxic and which do not adversely effect the taste in the concentrations specified. By the term polyhydric alcohols we generally intend to mean alcohols with three or more hydroxyl groups and having the general formula $HOCH_2(CHOH)_mCH_2OH$ where m is a number from 1–5. We also intend to cover as a polyhydric alcohol, polyethylene glycol, 1,3-butylene glycol, 1,3-butane diol, and propylene glycol. Generally, these polyhydric alcohols are water soluble, have small optical rotation in water and have some sweetness to taste. Among the polyhydric alcohols that may be used in this invention are the following:

Tritols
  glycerol
Tetritols
  etythritol
  D-threitol
  L-threitol
  D,L-threitol
Pentitols
  ribitol
  xylitol
  D-arabitol
  L-arabitol
Hexitols
  allitol
  dulcitol
  sorbitol (D-glucitol)
  L-glucitol
  D,L-glucitol
  D-mannitol
  L-mannitol
  D,L-mannitol
  D-talitol
  L-talitol
  D,L-talitol
  D-iditol
  L-iditol
Heptitols
  glycero-gluo-heptitol
  D-glycero-D-ido-heptitol
  perseitol
  volemitol
Octitol
  D-erythro-D-galacto-octitol The term sugar equivalent also includes the higher sugar alcohols. Glycerol and propylene glycol are acceptable sugar equivalents and are particularly useful in this invention. As used herein, the product should contain sugar or sugar equivalents or mixtures thereof. When using mixtures of the sugar and sugar equivalents, care must be taken to insure that the amount used reduces the osmotic pressure of the product to the extent that it imparts therein a bacteriostatic effect.

Preferred are propylene glycol, polyethylene glycol, and 1,3-butanediol, due to the fact that the sugar undergoes a browning reaction when dried.

The edible acids utilized within the scope of the invention are organic acids such as lactic, adipic, and succinic, and inorganic acids, such as phosphoric and hydrochloric. It is intended also that the edible acid may include edible acid salts such as monocalcium phosphate, monosodium phosphate, aluminum sulfate, aluminum amonium sulfate, aluminum calcium sulfate, aluminum potassium sulfate, and aluminum sodium sulfate, etc. which can effect the appropriate reduction in pH of the product. Especially useful within the scope of the present invention is phosphoric acid. The edible acids may be deleted, however, a decrease in the quantity of edible acid should be counteracted by a increase in sugar or sugar equivalent.

The antimycotic acts with the acid to assert the greatest possible activity against yeast and mold growth. Preferred are sorbic acid, and its salts but other edible antimycrobial acids such as benzoates, parabans, propionates, and acetates may be used.

Generally the dry pet food of the present invention is produced by admixing from 1–75 percent by weight proteinaceous material having a protein content of up to 50 percent; from 1–50 percent amylaceous ingredients; from 1–15 percent sugar, sugar equivalents, and mixtures thereof; from .01–.5 percent antimycotic, and up to 3 percent by weight edible acid, along with sufficient water for processing. Vitamins may be added as well. The amount of sugar and sugar equivalents can be increased, but such additional amounts will not further effect the stability of the product. Also, the amount of amylaceous ingredients can be increased leading, however, to a reduction of palatability.

More specifically, the ingredients are first dry blended and then the water and water containing ingredients are added until a cohesive dough is formed. Sufficient water is added to prevent crumbling of the dough yet the amount of water is such that the dough will release from a mold surface. The quantitative amount of water is dependent upon the specific ingredients used to form the dough and its determination is well known within the skill of the art. The cohesive dough may be shaped into a desired configuration before it is placed in an oven or other conventional drying means to produce a final product having a moisture content below 15 percent. A moisture content below 10 percent is preferred so that a dry, hard, product can be obtained. Shaping may be accomplished by using rotary molding techniques, extruding, pelleting, etc. The product is cooled and packaged along with a semi-moist pet food having a moisture content above 15 percent. In time the moisture content of the dry product and that of the semi-moist with which it is packaged will equalize so that the moisture content of the dry product will be above 15 percent, however, in accordance with the novel aspects of the present invention the dry pet food will remain free from mold and retain its integrity and shape, characteristic of a dry food.

To produce a nutritious product that is highly palatable to animals, the proteinaceous material should include both animal protein and non-animal protein, i.e., a vegetable protein and nutritious protein. A preferred supplement comprises from 25–40 percent animal protein in combination with from 20–35 percent non-animal protein and from 15 to 30 percent amylaceous ingredients along with the stabilizing system which preferably contains from 1–10 percent sugar or sugar equivalent. Due to browning of the sugar, a sugar equivalent, i.e., polyhydric alcohol, is preferred Referring now to FIG. 1 there is illustrated one method that may be utilized in the process to shape the dough. FIG. 1 illustrates the dough-like material 10 being introduced at room temperature onto rotary mold 12 through a hopper 11. On the surface of the rotary mold is a plurality of cavities whereby the dough-like material may be shaped into a desired configuration before it is deposited on conveyor 13 and sent through a drying oven 14, whereby the shaped product 17 may be dried by increasing its internal temperature up to at least 150°F. This may be accomplished by utilizing within the oven a temperature of from 200°–600°F. The product will then be cooled and packaged with semi-moist pet food.

FIG. 2 illustrates one section of a rotary mold 12 having a plurality of cavities 22 that form the dough into its desired shape.

FIG. 3 illustrates a second method of shaping the dough. This consists of extruding the dough through a die 35 onto a conveyor 13. The dough is then subdivided and cut into its desired configuration 37. For best results the dough is heated to a temperature between 125°F. and 190°F. and thereafter extruded into small strands and cooled. Drying is not necessary unless the moisture content is above 15 percent.

In order to further illustrate the invention, the following examples are presented:

EXAMPLE 1

| Ingredient | Weight Percent |
| --- | --- |
| Pork liver | 30 |
| Meat and Bone Meal | 7 |
| Dried whole egg | 14 |
| Dried cheddar cheese | 14 |
| Torula Yeast | 4 |
| Wheat Feed Flour | 5 |
| Wheat Feed Flour, modified (pregelatinized) | 3 |
| Propylene glycol | 6 |
| Potassium sorbate | 0.2 |
| Phosphoric acid | 1.0 |
| Vitamins and coloring | 13.7 |
| $H_2O$ | 2 |

A dry pet food is produced from the above ingredients by mixing the dry ingredients with the water and water containing ingredients to form a dough-like mass of material. The dough-like mass of material is then shaped by introducing it onto a rotary mold. The shaped product is then placed in a drying oven consisting of three sections. The first section has a temperature of 450°F. while the second section has a temperature of 375°F., and the third section has a temperature of 325°F. The product remained in the oven for 3.75 minutes so that the internal temperature of the wafer is increased to approximately 200°F. and the moisture content is reduced below 15 percent. When added to a semi-moist cat food the wafer is found to remain stable for great periods of time.

EXAMPLES 2, 3, and 4

Dry pet foods are produced from the ingredients illustrated in Table I utilizing the procedure of Example 1. In each, a product is obtained that remains stable when packaged with semi-moist pet food.

TABLE I

| Ingredients | Example 2 Percent | Example 3 Percent | Example 4 Percent |
| --- | --- | --- | --- |
| Pork lung | 30 | — | — |
| Meat by-products | — | 10 | — |
| Meat and Bone Meal | — | 8 | — |
| Liver meal | — | — | 14 |
| Soybean meal | — | — | 8 |
| Soy flour | — | 23 | — |
| Dried Whole egg | 15 | — | — |
| Dried cheddar cheese | 10 | — | — |
| Wheat germ meal | 10 | — | — |
| Torula yeast | 4 | 5 | — |
| Wheat feed flour | 19 | 28 | 45 |
| Propylene glycol | 4 | 3 | 5.5 |
| Potassium sorbate | .1 | 0.2 | 0.2 |
| Phosphoric acid | 1.5 | 2 | 1.5 |
| Animal fat | — | 4 | 4 |
| Dicalcium phosphate | 3.0 | 3 | 3 |
| Vitamins and coloring | 1.5 | 1.5 | 1 |
| $H_2O$ | 1.9 | 12.3 | 17.8 |

EXAMPLE 5

The procedure of Example 1 is again followed with the exception that propylene glycol is replaced by 1,3-butanediol. The product produced remains stable even when packed with semimoist cat food.

EXAMPLE 6

The procedure followed in Example 2 is utilized with the exception that adipic acid is substituted for phosphoric acid. The product obtained remains stable when one wafer is packaged with 1-½ oz. of semi-moist cat food.

EXAMPLE 7

The procedure of Example 1 is followed with the exception that sucrose is substituted for propylene glycol. The product obtained remains stable but has a poor appearance due to a browning reaction.

The examples are provided merely to illustrate the novel aspects of the present invention and are not intended to restrict or limit the scope of the invention in any manner. The invention, therefore, provides a dry pet food that can remain stable under high moisture contents and high humidity for long periods of time without the use of large amounts of sugar thus allowing dry pet foods to be packaged along with higher moisture content pet foods such as those known as semi-moist.

Obviously modifications of this invention are possible. It is understood, therefore, that this applicaton is intended to cover any variations, uses, or adaptations of the invention as may be considered to be known or customary practice in the art to which the invention pertains.

Having fully described and disclosed the invention, it is claimed:

1. In the combination of dry pet food and semi-moist pet food, the improvement wherein the dry pet food comprises:
   a. proteinaceous material;
   b. amylaceous ingredients;
   c. from 1 to 15 percent by weight of a member selected from the group consisting of sugar, sugar equivalents, and mixtures thereof;
   d. from 1 to 3 percent by weight edible acid;
   e. from 0.01 to 0.5 percent by weight antimycotic; and
   f. wherein the moisture content of said dry pet food is less than 15 percent by weight and said dry pet food is microbiologically stable.

2. In the combination of dry pet food and semi-moist pet food, the improvement wherein the dry pet food is stable in semi-moist conditions, said dry pet food comprising:
   a. from 1 to 75 percent by weight of proteinaceous material derived from either animal protein, vegetable protein or nutritious protein;
   b. from 1 to 50 percent by weight amylaceous ingredients;
   c. from 1 to 10 percent by weight polyhydric alcohol;
   d. from 1 to 3 percent by weight edible acid;
   e. from 0.01 to 0.5 percent by weight antimycotic;
   f. wherein the moisture content of said dry pet food is less than 10 percent by weight and the dry pet food is microbiologically stable.

3. A dry pet food as in claim 2 wherein the polyhydric alcohol comprises propylene glycol, 1,3-butanediol, or polyethylene glycol.

4. A pet food as in claim 2 wherein said edible acid is phosphoric acid and said antimycotic is potassium sorbate.

5. A pet food as in claim 1 wherein said sugar is sucrose or dextrose.

6. A method for providing semi-moist pet foods with a nutritious dry pet food that is stable in semi-moist conditions comprising the steps of:
   a. mixing proteinaceous material, amylaceous ingredients, from 1 to 10 percent by weight of a member selected from the group consisting of sugar, sugar equivalents, and mixtures thereof, from 1 to 3 percent by weight edible acid, and from 0.01 to 0.5 percent by weight antimycotic with sufficient water for processing;
   b. further mixing said ingredients to form a dough;
   c. shaping said dough into a desired configuration;
   d. after the shaping step, drying said shaped dough to produce a dry, brittle product; and
   e. combining said dry brittle product with a semi-moist pet food.

7. A method according to claim 6 wherein said dough is dried at a temperature between 200°–600°F. so that the temperature of the shaped dough is above 150°F.

8. A method for providing semi-moist pet foods with a highly nutritious vitamin enriched dry pet food that is stable in semi-moist conditions, comprising the steps of:
   a. mixing from 1 to 75 percent by weight proteinaceous material derived from animal, vegetable, or nutritious protein, from 1 to 50 percent by weight amylaceous ingredients, from 1 to 10 percent by weight polyhydric alcohol, from 1 to 3 percent by weight edible acid, from 0.01 to 0.5 percent by weight antimycotic, with sufficient water for processing;
   b. further mixing said ingredients to form a dough;
   c. shaping said dough to form a desired configuration;
   d. drying said shaped dough so that the internal temperature of the dough reaches 150°F. and the moisture content of the dry dough is less than 15 percent by weight;
   e. cooling said dry dough; and
   f. combining said dry dough with a semi-moist pet food.

9. A method according to claim 7 wherein said dough is shaped in a rotary mold.

10. A method according to claim 6 wherein said dough is shaped by passing it through an extruder die.

* * * * *